R. ZAHN.
DEVICE FOR CONTROLLING FEED MECHANISMS.
APPLICATION FILED MAR. 18, 1910.
966,977.
Patented Aug. 9, 1910.
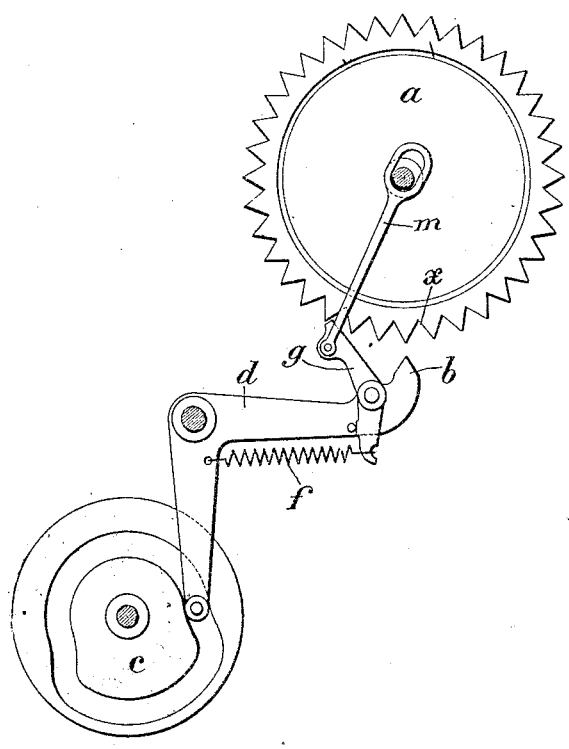
WITNESSES:
INVENTOR:
Robert Zahn,
By Attorneys,

UNITED STATES PATENT OFFICE.

ROBERT ZAHN, OF PLAUEN, GERMANY.

DEVICE FOR CONTROLLING FEED MECHANISMS.

966,977.

Specification of Letters Patent. Patented Aug. 9, 1910.

Application filed March 18, 1910. Serial No. 550,178.

*To all whom it may concern:*

Be it known that I, ROBERT ZAHN, a subject of the King of Bavaria, and resident of Plauen, Germany, have invented a new and useful Device for Controlling Feed Mechanisms, of which the following is a full, clear, and exact specification.

Where feed mechanisms are used for certain purposes, as for instance for the controlling of patterns in the punching of the holes in the Jacquard card of embroidery machines, it occurs that the member to be fed or controlled has to be moved according to a variable multiple of a unit, and for the purpose of temporarily securing the particular feed of this member, it is common to use a controlling set of edged teeth (on the circumference of a wheel or on a rod), connected with this member and with which, after each feed of the member to be controlled, a so called positioning tooth is brought into engagement. It may occur, however, that the feed of the member to be controlled is such that the positioning tooth in its securing movement strikes just on the edge of one of the edged teeth of the said controlling set, so that it is unable to fall into the notch between two teeth and in this particular case, the desired control does not act. This disadvantage is remedied by the protective device for controlling feed mechanisms, which forms the subject matter of the present invention, and which, like the known devices of this kind, shows a controlling set of edged teeth connected with the feed mechanism, as well as a positioning tooth coöperating therewith. In the improved device, however, the positioning tooth which is rigidly carried by an actuating lever is combined with a spring controlled interconnecting lever between said actuating lever and the controlling set of teeth, engaging this latter and which is arranged relatively to the positioning tooth in such a manner that when the positioning tooth may happen to strike on the edge of one of the controlling teeth, the interconnecting lever will shift the controlling set of edged teeth so as to allow the positioning tooth of being thrust into a notch between two controlling teeth. According to this arrangement the desired protective control for the feed is obtained in any case, that is to say, the positioning tooth is always thrust into the notch corresponding to the particular feed.

The accompanying drawing shows the preferred form of the improved controlling device in side view, partly in section.

$a$ is a wheel provided with edged teeth on its periphery, which is to be considered as connected with the member to be fed or controlled, so as to be movable with it.

$b$ is the positioning tooth, which is moved to and from the wheel $a$ by means of an actuating lever $d$ controlled by a grooved cam disk $c$. The positioning tooth $b$ is carried by the actuating lever $d$ with which it is made in one piece. On the actuating lever $d$ is pivotally mounted a lever $g$ controlled by a spring $f$ and which under the control of this spring engages between two teeth of the wheel $a$ like a pawl as represented in the drawing.

If the wheel $a$ is turned by exactly the amount equivalent to the pitch of the teeth, and the tooth $b$ moved up against the wheel $a$, then the tooth $b$ will fall into a notch between two teeth of the wheel and hold the latter fast. Should the wheel $a$, however, have been so turned that when the edge of the positioning tooth $b$ comes into operation under the control of the cam disk $c$, its edge may happen to hit the edge of a tooth of the wheel $a$, the pawl-like lever $g$—which moves toward the wheel $a$ a little in advance of the positioning tooth $b$—is brought against a tooth of the wheel $a$, and as the actuating lever $d$ continues its securing movement, shifts the wheel $a$ a little to the left, so that the positioning tooth $b$ can enter the notch $x$ between two teeth of the wheel $a$. Immediately the positioning tooth $b$ has entered the notch $x$ between two teeth, the shifting lever $g$, which is connected to a guide rod $m$, will be disengaged from the teeth of the wheel $a$ owing to the angular movement of the actuating lever $d$ and to the control of the guide rod $m$ which bearing against the axis of the wheel $a$ pushes the shifting lever $g$ out of the teeth of the wheel $a$, rocking it on the actuating lever $d$ against the action of the spring $f$ so that there will be no restraint to the complete engagement of the positioning tooth $b$ in the notch $x$ between two teeth of the wheel $a$.

What I claim is:

1. A device for controlling feed mechanisms, comprising a controlling set of edged teeth connected with the feed mechanism, a positioning tooth coöperating therewith, an actuating member carrying said positioning tooth and interconnecting means between said actuating member and the controlling set of teeth, whereby said interconnecting means are adapted to shift the controlling set of teeth when the positioning tooth may happen to impinge on the edge of a tooth thereof.

2. A device for controlling feed mechanisms, comprising a controlling set of edged teeth connected with the feed mechanism, a positioning tooth coöperating therewith, an actuating lever carrying rigidly said positioning tooth and an interconnecting lever between said actuating lever and the controlling set of teeth, whereby said interconnecting lever is adapted to shift the controlling set of teeth when the positioning tooth may happen to impinge on the edge of a tooth thereof.

3. A device for controlling feed mechanisms, comprising a controlling set of edged teeth connected with the feed mechanism, a positioning tooth coöperating therewith, an actuating lever carrying rigidly said positioning tooth and a spring controlled shifting lever articulated upon said actuating lever and engaging the controlling set of teeth, so as to be capable of shifting the controlling set of teeth when the positioning tooth may happen to impinge on the edge of a tooth thereof.

4. A device for controlling feed mechanisms, comprising a controlling set of edged teeth connected with the feed mechanism, a positioning tooth coöperating therewith, an actuating lever carrying rigidly said positioning tooth, a spring controlled shifting lever articulated upon said actuating lever and engaging the controlling set of teeth, and a guide member for said shifting lever, whereby the shifting lever is adapted to shift the controlling set of teeth when the positioning tooth may happen to impinge on the edge of a tooth thereof.

In witness whereof I have hereunto signed my name this 21st day of February 1910, in the presence of two subscribing witnesses.

ROBERT ZAHN.

Witnesses:
ROBERT H. NIER,
RICHARD B. WASHINGTON.